G. W. COOK.
THILL TUG.
APPLICATION FILED MAR. 17, 1914.
1,131,679. Patented Mar. 16, 1915.
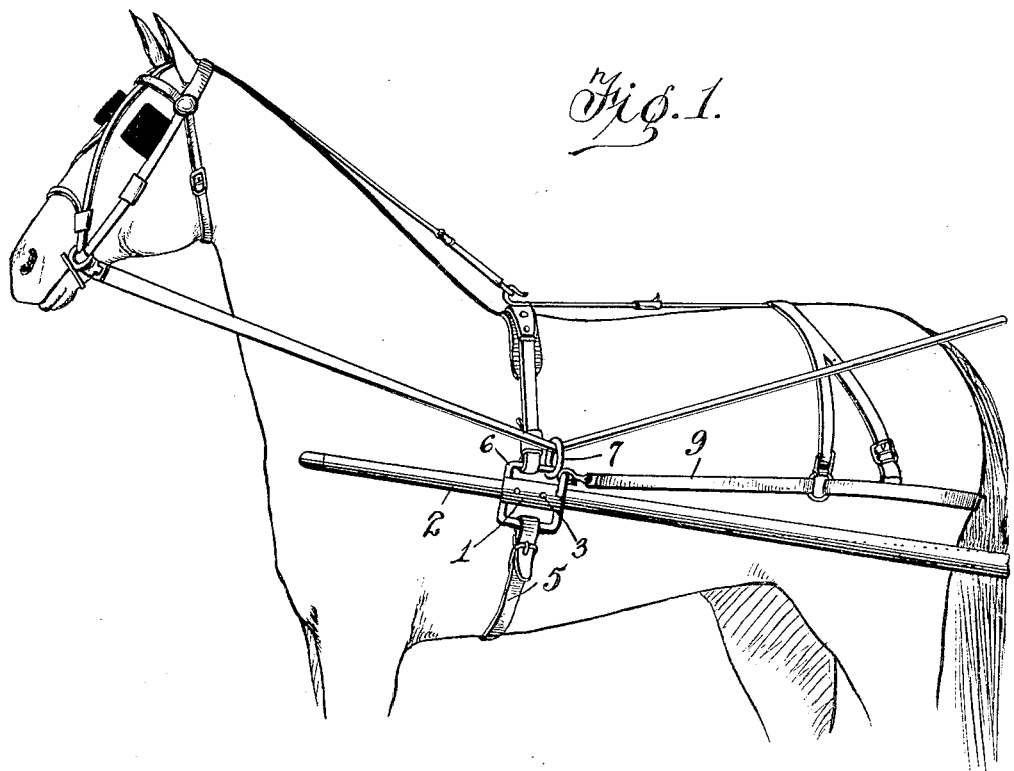
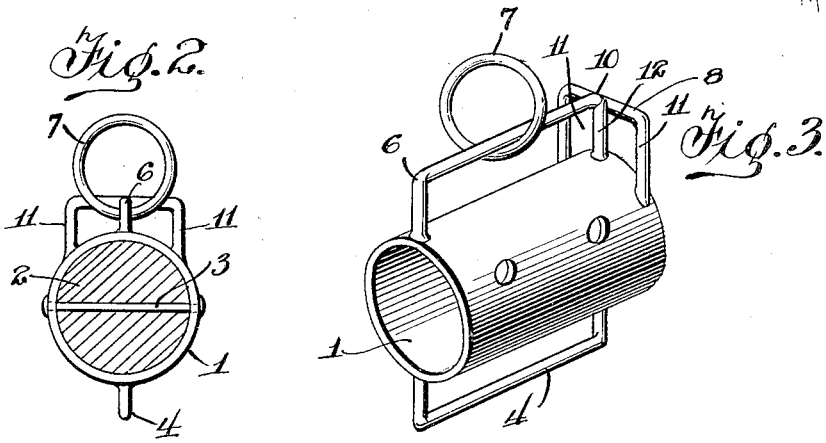
Witnesses
W. C. Mulligan
C. H. Crawford
Inventor
George W. Cook
By Richard Bowen,
his Attorney

UNITED STATES PATENT OFFICE.

GEORGE W. COOK, OF NEOSHO RAPIDS, KANSAS.

THILL-TUG.

1,131,679.  Specification of Letters Patent.  Patented Mar. 16, 1915.

Application filed March 17, 1914. Serial No. 825,383.

*To all whom it may concern:*

Be it known that I, GEORGE W. COOK, a citizen of the United States, residing at Neosho Rapids, in the county of Lyon and State of Kansas, have invented certain new and useful Improvements in Thill-Tugs, of which the following is a specification.

This invention relates to an improved means for attachment of portions of a harness to the shafts or thills of a vehicle, and one of the objects of the invention is to provide means of this character for use in connection with the usual form of harness wherein draft is obtained by the usual leather tugs and wherein the back, belly, and hold back straps are attached to the shafts, or in connection with racing and other light harness wherein the shafts are connected with the back and belly straps and wherein tugs and breeching are dispensed with.

In either utility of my invention, it is an object to provide means through which the lines may be threaded so as to dispose the lines laterally of the horse and prevent the lines from getting under the horse's tail.

It is a further object of my invention to provide harness attaching means on a shaft with portions projecting therefrom for attachment to the back, bellyband and also the holdback straps, said portions being connected with each other so that one will reinforce and support the other against stress of draft pull or back pull upon said means.

It is of course understood that the device of my invention is adapted for use as a connecting device for parts of the harness when it is desired to employ the usual tugs.

Other features and objects of the invention will be more fully described in connection with the accompanying drawing and will be more particularly pointed out and ascertained in and by the appended claims.

In the drawing:—Figure 1 is a view in elevation of the device of my invention showing its utility as a draft tug. Fig. 2 is a sectional view through the shaft showing the device of my invention applied thereto. Fig. 3 is a perspective view of the device of my invention detached from the shaft.

Like characters of reference designate similar parts throughout the different figures of the drawing.

As illustrated, my invention comprises a sleeve 1 adapted to telescope a shaft 2 and be secured in the desired position thereon by means such as rivets 3 which are shown extending through the sleeve 1 and the shaft 2. It will be understood that in some utilities of my invention, such for instance in connection with a horse releasing device, I may not find it necessary to anchor the sleeve against movement in both directions on the shaft.

The sleeve 1 is provided with a downwardly projecting portion, preferably in the form of a loop 4, adapted for attachment of the bellyband strap 5 and with a similarly formed upwardly projecting portion 6 for attachment to the backband strap 6'.

In order to provide means for holding the reins at one side of the animal so as to prevent them from getting under the horse's tail, I dispose a rein ring 7 on the backstrap attaching loop 6, to be disposed either forwardly or rearwardly of the backstrap attached end, as desired.

In the rear of the loop 6, which is shown extending longitudinally of the sleeve 1, I provide a transversely disposed loop 8 which is adapted for connection with the backstrap 9. The holdback loop 8 is connected with the backstrap loop 6, as indicated at 10, so that draft pull forwardly on the loop 6 will not be imposed wholly upon the loop 6 and its connection with the sleeve 1, as the loop 8 will strengthen the loop 6 against the stress of draft pull. Likewise, when the vehicle is backed up, the loop 6 will support the loop 8 against stress imposed by the holdback strap 9.

By means of this construction, it will be seen that the projecting attaching portions or loops 6 and 8 can be made of very small size so as not to present an objectionable appearance, by reason of the fact that the loops 6 and 8 are connected with each other, at a point remote from the sleeve 1, so that one will reinforce the other. In the most improved construction, I cast the device in one piece, as shown in Fig. 3, the ring 7 being later assembled therewith.

It will be noted that the loop not only extends angularly, or in the precise construction shown, transversely of the loop 6, but is symmetrical with respect to the loop 6 so as to present attaching loops 11, on opposite sides of leg 12, and which are formed by the leg 12 and the loop 8. Thus it will be seen that the shaft tugs do not have to be made rights and lefts as a tug shown in Fig. 3 is adapted for use either on the right or left hand shaft.

In some utilities of my invention, one of the devices will be placed in position for attachment to the backband and the bellyband, and another device will be placed rearwardly of the first-named device on the same shaft or thill for attachment to the holdback strap. Furthermore, the device of my invention is capable of being utilized in numerous horse-releasing devices where the sleeve or band 1 would be releasably held on the shaft, or as a shaft tug, or as a fixed sleeve for attaching portions of the harness, as illustrated.

While I have herein shown and described one specific form of my invention, I do not wish to be limited thereto except for such limitations as the claims may import.

I claim:—

1. As a means for attaching portions of a harness to a vehicle shaft, a sleeve-like device adapted to be mounted on a shaft and having an upstanding loop, and a second upstanding loop transversely and symmetrically disposed with respect to the first-named loop and divided thereby to form two loop openings, substantially as described.

2. As a means for attaching portions of a harness to a vehicle shaft, the combination of a sleeve like device adapted to be mounted on the shaft, diametrically opposed longitudinal loops formed on said device, a transverse loop symmetrically disposed with respect to one of first said loops and divided thereby to form a pair of loop openings, and means carried by the last said longitudinal loop for threading a rein therethrough substantially as described.

3. As a means for attaching portions of a harness to the shaft of a vehicle, a device for attachment to the shaft of a vehicle and provided with a loop portion for attachment to the backstrap, a loop portion for attachment to the bellyband, a loop portion for attachment to the hold-back strap, and a rein ring in one of said loop portions for holding the reins against upward movement, substantially as described.

4. In a shaft device, a sleeve having oppositely projecting portions, one for the backband and one for the bellyband and a third attaching portion projecting from the sleeve for attachment to the holdback and connected with one of said first-named portions whereby one will support the other against stress or draft pull or back pull, and means carried by one of said portions for threading a rein therethrough, substantially as described.

In testimony whereof I affix my signature in presence of two witnesses.

GEORGE W. COOK.

Witnesses:
W. A. MOUNKES,
C. C. CAMPBELL.

Copies of this patent may be obtained for five cents each, by addressing the "Commissioner of Patents, Washington, D. C."